United States Patent [19]

Kifor

[11] 4,440,336
[45] Apr. 3, 1984

[54] APPARATUS FOR ATTACHING FASTENERS TO BELTS

[75] Inventor: Harry T. Kifor, Canton, Ohio

[73] Assignee: The Goodyear Tire & Rubber Company, Akron, Ohio

[21] Appl. No.: 279,716

[22] Filed: Jul. 2, 1981

[51] Int. Cl.³ .............................................. B27F 7/14
[52] U.S. Cl. ......................................... 227/4; 227/111
[58] Field of Search ........................... 227/4, 110, 111; 24/33 B, 31 B; 308/6 R

[56] References Cited

U.S. PATENT DOCUMENTS

| | | | |
|---|---|---|---|
| 2,896,213 | 7/1959 | Alderman et al. | 227/4 X |
| 2,915,754 | 12/1959 | Wandel | 227/111 X |
| 3,670,941 | 6/1972 | Grinnell et al. | 227/110 X |
| 3,742,557 | 7/1973 | Francois | 24/33 B |
| 3,743,158 | 7/1973 | Cohn et al. | 227/110 X |
| 3,913,180 | 10/1975 | Pray | 24/33 B X |
| 4,161,059 | 7/1979 | Francois | 29/432 |
| 4,211,353 | 7/1980 | Aunis | 227/8 X |
| 4,212,094 | 7/1980 | Pray | 24/31 B |
| 4,258,461 | 3/1981 | Pray | 29/243 |

FOREIGN PATENT DOCUMENTS

52-1793  1/1977  Japan ................................. 227/4

*Primary Examiner*—Fred Silverberg
*Assistant Examiner*—Timothy V. Eley
*Attorney, Agent, or Firm*—F. K. Lacher; T. P. Lewandowski

[57] ABSTRACT

A riveting gun is mounted on a carriage for movement on a way to a plurality of positions over belt fasteners placed along the edge of a clamped belt. The gun is guided into the desired positions by an indexing member which permits actuation of the gun for driving the rivets through the fasteners and belt when in position. A rivet deforming member on the other side of the belt upsets the rivets. Resilient mounting of the carriage is provided to maintain alignment and absorb impact reaction stresses.

7 Claims, 8 Drawing Figures

APPARATUS FOR ATTACHING FASTENERS TO BELTS

This invention relates to belt fasteners of the type which have two plates connected by a U-shaped member and especially to apparatus for riveting the plates and the interposed belt together. The U-shaped members of opposing belt ends intermesh and a hinge pin is inserted through the adjacent openings providing a belt connection.

Heretofore belt fasteners have been riveted to the ends of belts by manually driving the rivets through the belt with a hammer. The belt has been clamped to a supporting structure and the fasteners positioned at desired intervals along the belt. Each of the rivets has a mandrel with one end for inserting in the hollow end of the rivet and the other end pointed for penetrating the belt. When the rivet is driven through the belt and fasteners the mandrel engages a deforming member and the end of the rivet is upset while at the same time the mandrel is separated from the rivet.

Problems have been had positioning the rivets and a guide block has been devised to hold a number of rivets in position in an attempt to improve the operation. This requires a punch tool for insertion in the guide block to engage the rivets. The driving of rivets by manual hammering often damages the rivet heads and other parts of the clamp due to fatigue of the operator and failure to hit the rivets properly. It is also practically impossible to drive and upset each rivet with the same forces and therefore the clamping forces of each fastener on the belt have not been uniform across the belt. This results in undesirable stress concentrations and weaknesses due to nonuniformity. In addition the process has been slow requiring hours to apply the fasteners to the ends of an ordinary belt. This is especially costly when the fasteners are being attached to repair an operating belt and the belt operation is shut down for that time.

The present invention is directed to apparatus in which the riveting is done by an air gun with each of the rivets being driven through the fastener plates and belt with one stroke. This provides an equal clamping force for each fastener on the belt due to the uniformity of torque applied by the gun. Also the time required is reduced to minutes because each rivet can be indexed and driven in around one second.

The indexing of the gun for driving the rivets is provided by a hinged support for the gun which has an indexing pin for registering with index holes in an indexing track. Also resilient mounting of the gun support is provided to maintain alignment and absorb shock forces resulting from the rapid driving action of the gun.

In accordance with an aspect of the invention an apparatus is provided for riveting a plate member to an edge portion of an elongated article comprising a supporting structure, a rivet driving means mounted on the supporting structure for movement to a plurality of riveting positions over the article and the edge portion, guide means for directing the rivet driving means to the riveting positions, the rivet driving means being actuated in response to movement of the rivet driving means into each of the riveting positions for insertion of a rivet through the article and the edge portion.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
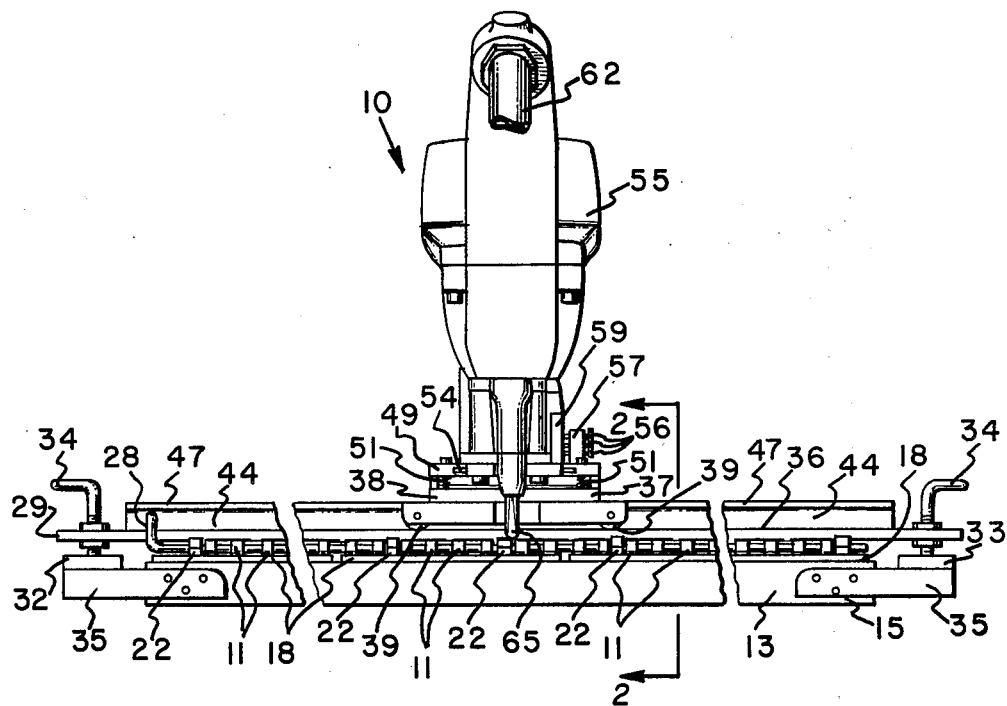
FIG. 1 is a front elevation of the apparatus embodying the invention with parts being broken out.
Figure 3:
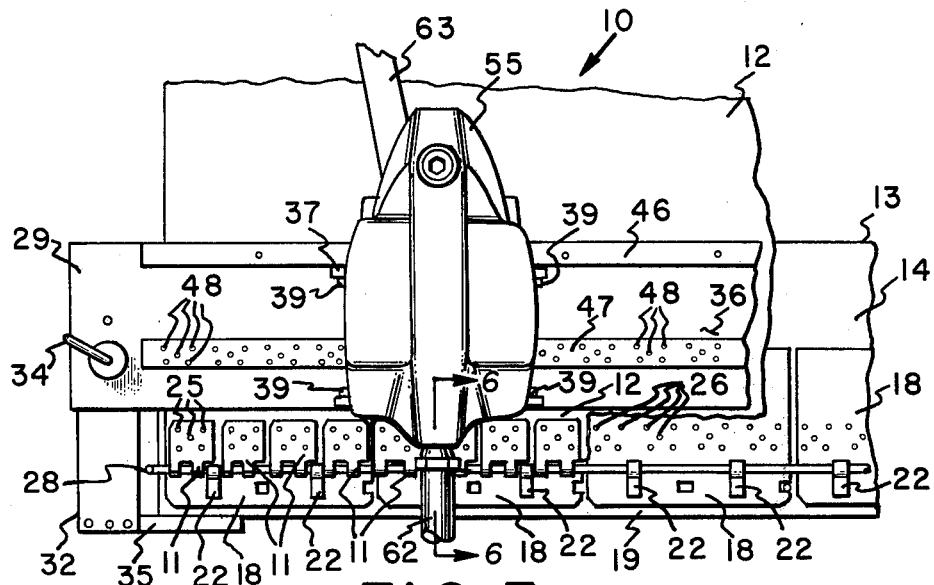
FIG. 3 is a fragmentary plan view showing the rivet gun at one end of the apparatus and with parts being broken away to show the rivet deforming plate and the supporting structure under the belt.
Figure 2:
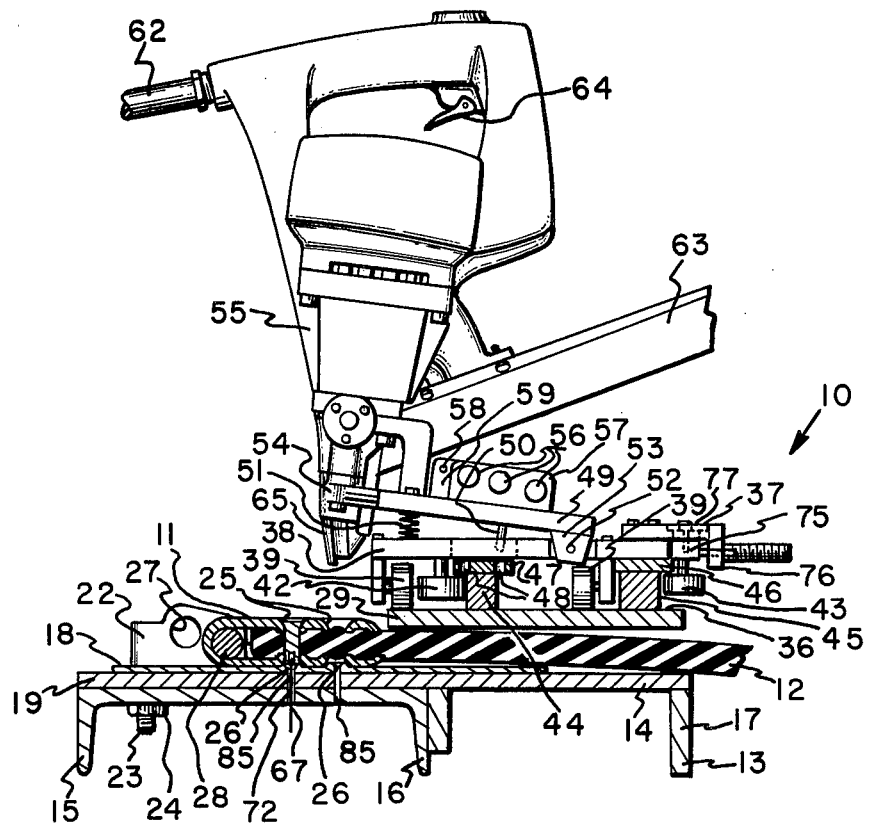
FIG. 2 is a sectional view taken along the line 2—2 in FIG. 1.

Referring to FIGS. 1, 2 and 3 an apparatus 10 is shown for riveting plate members such as belt fasteners 11 to an elongated article such as belt 12. A supporting structure 13 includes an elongated base plate 14 which may be supported on flanges 15, 16 and 17 adaptable to rest on a table or other supporting surface.

Rivet deforming members such as perforated plates 18 are positioned along a front edge portion 19 of the supporting structure 13. Fastener alignment lugs 22 are also positioned along the front portion 19 at spaced-apart positions and have threaded studs 23 extending through aligned holes in the perforated plates 18 and supporting structure 13 so that nuts 24 can be threaded on the studs to hold the perforated plates 18 and lugs 22 against the base plate 14. As shown in FIG. 3 the belt fasteners 11 have holes 25 and these correspond with holes 26 in the perforated plates 18. The alignment lugs 22 also have alignment holes 27 in which a pseudo hinge pin 28 is held for alignment of the belt fasteners 11.

Positioned above the base plate 14 and perforated plates 18 is a clamp bar 29 which may be fastened to end bars 32 and 33 by turn screws 34 at the ends of the apparatus 10. The end bars 32 may be connected to the supporting structure 13 by suitable connecting bars 35 attached to the flanges 15, 16 and 17.

Figure 4:
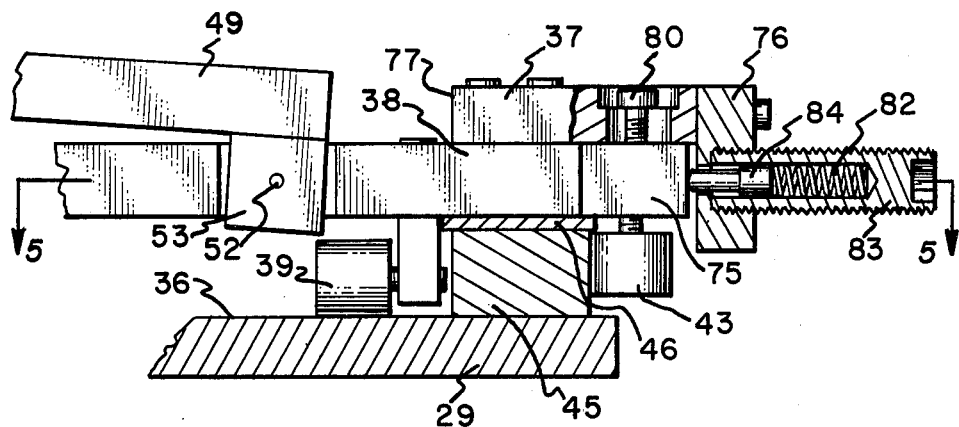
FIG. 4 is an enlarged fragmentary sectional view like FIG. 2 but with parts broken away to show the spring loading of the bar connected to the rear yoke rollers.

An upper surface 36 of the clamp bar 29 provides a way on which a carriage 37 is supported for movement from one end of the clamp bar to the other. The carriage 37 has a carriage plate 38 supported by cam rollers 39 in engagement with the upper surface 36 of the clamp bar 29. Restricting movement transversely of the clamp bar 29 are forward yoke rollers 42 and rear yoke rollers 43 mounted on the carriage 37 and in rolling engagement with a forward rail 44 and a rear rail 45 respectively. The rails 44 and 45 are attached to and extend longitudinally of the clamp bar 29. The rear rail 45 may have a track 46 extending outwardly beyond the edges of the rear rail as shown in FIGS. 2 and 4. The front rail 44 may have an indexing track 47 with indexing holes 48 at predetermined positions therealong.

A hinged support such as hinged plate 49 is pivotally mounted on the carriage plate 38 by hinge pins 52 extending through lugs 53 at the rear side edges of the hinged plate. Resilient members such as springs 51 may be positioned between the carriage plate 38 and the hinged plate 49 at the forward portion as shown in FIGS. 1 and 2. The hinged plate 49 may have a slide member 54 for adjustable movement forward or to the rear and a rivet driving means such as a rivet gun 55 may be mounted on the slide member as shown in FIGS. 1 and 2. The slide member 54 is held in adjustable positions by pins 56 which may be spring loaded in a pin positioning plate 57 mounted on the hinged plate 49 and engageable with holes 58 in a slide positioning plate 59 mounted on the slide member 54.

The rivet gun 55 is of a type commercially available modified to accept a rivet or other type of fasteners having two diameters. The gun 55 is connected to a source of air pressure by an air hose 62. The rivet gun 55 receives rivets from a gravity feed magazine 63. On actuation of a finger switch 64 and depressing movement of a safety extension 65 an air actuated anvil 66 as shown in FIGS. 6 and 7 impacts a rivet 67 driving it through the belt 12 and the belt fastener 11.

Figure 6:
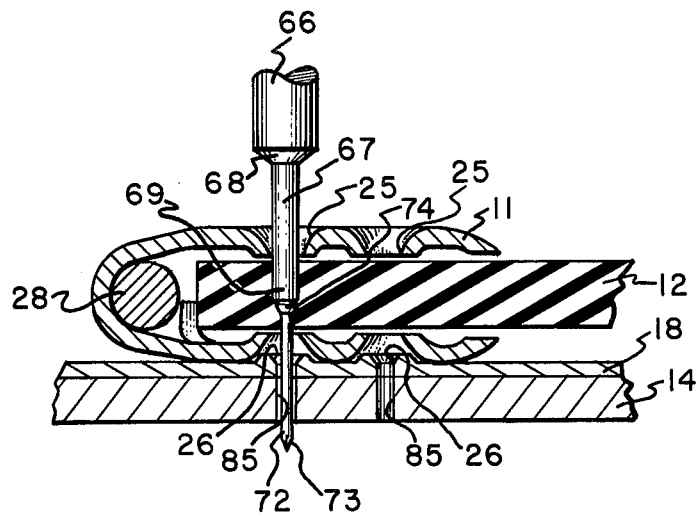
FIG. 6 is an enlarged fragmentary sectional view taken along the line 6—6 in FIG. 3 showing the rivet being driven through the third row of the hinged fasteners and the belt.
Figure 7:
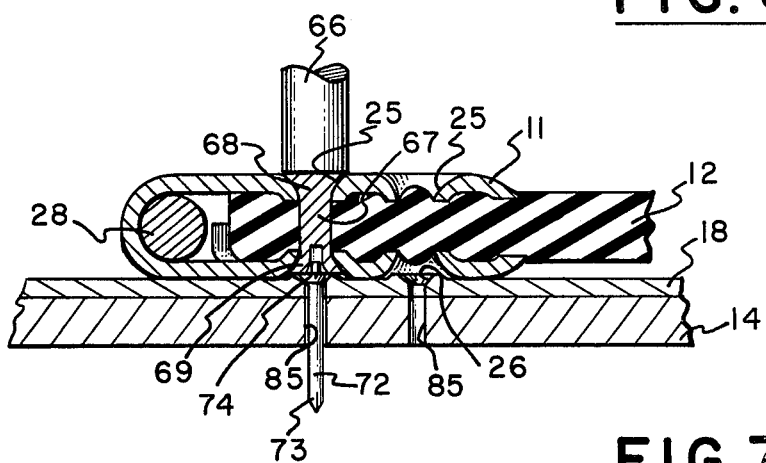
FIG. 7 is a sectional view like FIG. 6 showing the rivet after having been driven through the belt and fasteners and then upset.

In this embodiment the apparatus 10 is adapted for driving a rivet 67 of the type shown in FIGS. 2, 6 and 7. The rivet 67 has a flanged end 68 and a hollow end 69 which is attached to a mandrel 72 having a pointed end 73 and a formed end 74 positioned in the hollow end of the rivet.

Figure 5:
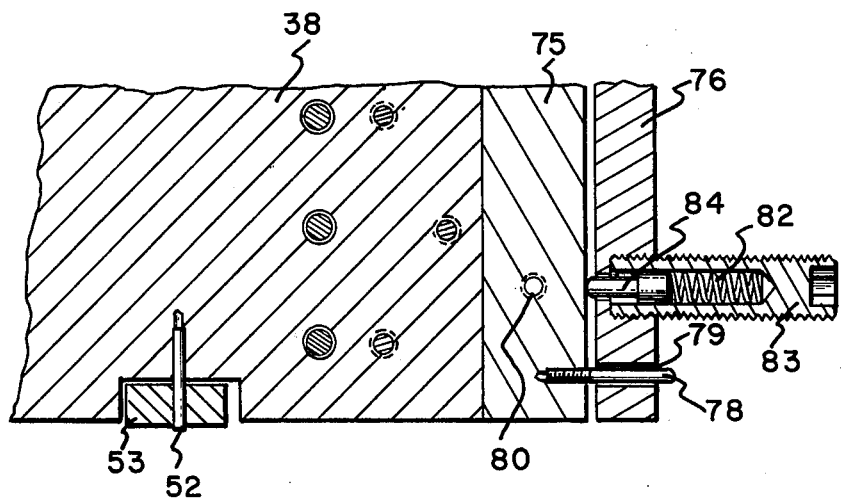
FIG. 5 is a fragmentary sectional view taken along the line 5—5 in FIG. 4.

Referring to FIGS. 4 and 5 the carriage plate 38 has a movable support member or bar 75 positioned between the carriage plate 38 and a back plate 76. The back plate 76 and the carriage plate 38 are connected by a connecting plate 77. Guide pins 78 threaded in the bar 75 extend through holes 79 in the back plate 76 to support the bar in sliding engagement with the back plate. Also screws 80 extending through slotted openings in the connecting plate 77 support the bar 75 for sliding movement between the edge of the carriage plate 38 and the back plate 76. Resilient means such as a spring 82 in a spring plunger 83 urge a plunger 84 into engagement with the bar 75. The rear yoke rollers 43 are mounted on the bar 75 and the force of the spring plunger 83 is transmitted through the bar to the rear yoke rollers into engagement with the rail 45. Accordingly during operation of the apparatus 10 impact forces caused by the firing of the rivet gun 55 are cushioned by the spring 82 permitting the carriage 37 to move and preventing damage to other parts of the apparatus. The spring 82 also maintains the alignment position of the carriage 37 on the rails 45 and 46.

In the operation of the apparatus 10 belt fasteners 11 are placed over the end of the belt 12 which is positioned between the clamp bar 29 and base plate 14. The belt fasteners 11 are held in alignment by the pseudo hinge pin 28 which extends through the U-shaped ends of the fasteners and through the holes 27 in the fastener alignment lugs 22 which may also hold the fasteners in spaced relation along the edge of the belt 12. In this position the holes 25 and the belt fasteners 11 are in alignment with the holes 26 in the perforated plate 18 and as shown in FIGS. 6 and 7 these holes are in alignment with holes 85 in the base plate 14. Also the indexing holes 48 in the indexing track 47 are in alignment with the holes 25, 26 and 85 in the belt fasteners 11, perforated plate 18 and base plate 14. The operator then clamps the belt 12 between the clamp bar 29 and the base plate 14 by turning the turn screws 34.

The rivet gun 55 is loaded by inserting rivets 67 in the magazine 63 for gravity feeding of the rivets into the gun. The operation then may move the gun 55 and the carriage 37 to a position preferably at one end of the clamp bar 29. The gun 55 is pressed downwards so that an indexing pin 50 mounted on the slide member 54 will enter one of the indexing holes 48 corresponding to one of the holes 25 in the belt fasteners 11. Upon further downward movement of the gun 55 the safety extension 65 will be retraced and then upon actuation of the finger switch 64 the gun will be actuated and the anvil 66 drives a rivet 67 through the holes 25 in the fasteners 11, through the belt 12 and into the holes 26 in the perforated plate 18 and the holes 85 in the base plate 14 as shown in FIG. 6. As the rivet 67 is driven through the belt 12 the mandrel 72 engages the chamfered hole 26 in the perforated plate 18 and the hollow end 69 of the rivet is upset as shown in FIG. 7. As this happens the mandrel 72 is separated from the rivet 67 and remains in the holes 26 and 85 in the perforated plate 18 and base plate 14 until after the riveting operation has been completed for all of the belt fasteners 11.

The operator then lifts the gun 55 and moves it towards the other end of the clamp bar 29 with the indexing pin 50 pressing against the top of the indexing track 47 until the pin enters the next hole 48 in that row of holes. At that time the gun 55 may be further lowered into operating position and on actuation of the finger switch 64 another rivet 67 is driven through the belt 12 and fastener 11. This operation may be repeated until one row of rivets is completed. The operator then adjusts the slide member 54 so that the indexing pin 50 is in alignment with a second row of holes 48. This is done by adjusting the pins 56 in the pin positioning plate 57 so that the proper holes 58 are engaged. Then starting at one end the procedure described above is continued with the indexing pin 50 entering the holes 48 in a second row at which time a second row of rivets 67 is completed.

Then where there is a third row of rivets as shown in this embodiment the slide member 54 is adjusted by utilizing the pin positioning plate 57 and slide positioning plate 59 to move the indexing pin 50 to a third position for engaging a third row of indexing holes 48 and riveting a third row of rivets in the belt fasteners 11.

During these operations the impact from the operation of the gun 55 is cushioned by the springs 82 in the spring plungers 83.

Figure 8:
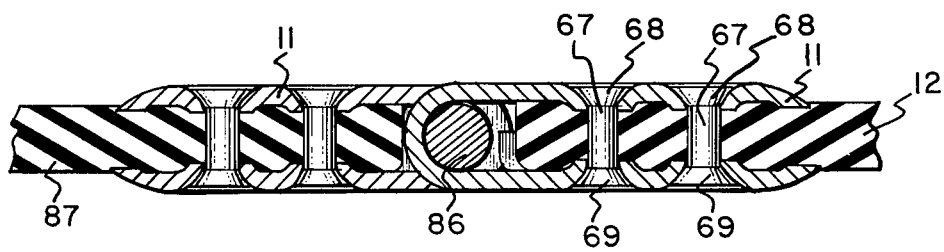
FIG. 8 is a sectional view of the two edges of a belt connected by belt fasteners riveted to the edges and connected by a hinge pin.

After the belt fasteners 11 have been riveted to the belt 12 as shown in FIG. 8 a pseudo hinge pin 28 is removed and the clamp bar 29 moved upward by turning the turn screws 34. The belt 12 may then be removed from the apparatus 10 and as shown in FIG. 8 the fasteners 11 may be connected to another belt 87 with similar fasteners and connected by a hinge pin 86.

With this apparatus 10 the gun 55 drives the rivets 67 through the belt 12 and upsets the hollow end 69 clamping the belt between the belt fastener 11 as shown in FIGS. 6 and 7. This operation has been done in one stroke with a uniform pressure at a rate of one rivet per second. Therefore not only are the fasteners 11 attached to the belt 12 quickly but also uniformly so that in use the forces transmitted by the fasteners are evenly distributed across the belt.

While a certain representative embodiment and details have been shown for the purpose of illustrating the invention it will be apparent to those skilled in the art that various changes and modifications may be made therein without departing from the spirit or scope of the invention. For example, by mechanically securing the finger switch 64 in the actuating position and by providing automatic lateral travel of the carriage 37 the apparatus 10 could be completely automatic.

What is claimed is:

1. Apparatus for riveting a plate member of a belt fastener having a plurality of holes to an edge portion of a belt comprising a supporting structure including a way, a rivet driving means mounted on a carriage movable on said way for movement to a plurality of riveting positions over said holes in said plate member positioned over said edge portion, said carriage including a hinged support on which said rivet driving means is mounted for movement towards and away from said belt and said belt fastener, guide means for directing said rivet driving means to said riveting positions over said holes in said plate member, said rivet driving means being actuated in response to movement of said rivet driving means into each of said riveting positions for insertion of a rivet through each of said holes in said plate member and into said edge portion and resilient means for urging said hinged support away from said belt fastener.

2. Apparatus in accordance with claim 1 wherein said guide means includes an indexing track on said way having a plurality of indexing holes corresponding to said holes in said belt fastener and said hinged support having an indexing pin movable into said indexing holes for locating said carriage in a position for movement of said rivet driving means downward on said hinged support into a riveting position corresponding to the hole in said indexing track in engagement with said indexing pin.

3. Apparatus in accordance with claim 2 wherein said holes in said belt fastener are located in spaced-apart rows parallel to the edge portion of said belt in said edge portion and said rows being spaced at different distances from said edge, said indexing holes in said indexing track being located in corresponding spaced-apart rows and said rivet driving means being mounted for adjustment toward and away from said edge of said belt so that said indexing guide pin may be engageable with indexing holes in different rows in said indexing track.

4. Apparatus in accordance with claim 3 wherein said hinged support includes a slide member movable towards and away from the hinged portion of said hinged support and positioning means for indexing said slide member at a selected location where said indexing guide pin is engageable with one of said rows of indexing holes in said indexing track.

5. Apparatus in accordance with claim 1 wherein said rivet driving means includes an air actuated anvil for impacting the rivets, a safety extension movable with said hinged support plate downward into engagement with said belt fastener and the actuation of said rivet driving means being in response to movement of said safety extension upon engagement with said belt fasteners during downward movement with said hinged support.

6. Apparatus for riveting a plate member of a belt fastener having a plurality of holes to an edge portion of a belt comprising a supporting structure including a way, a rivet driving means mounted on a carriage movable on said way for movement to a plurality of riveting positions over said holes in said plate member positioned over said edge portion, guide means for directing said rivet driving means to said riveting positions over said holes in said plate member, said rivet driving means being actuated in response to movement of said rivet driving means into each of said riveting positions for insertion of a rivet through each of said holes in said plate member and into said edge portion, said carriage movement in a forward direction being restricted by rear yoke rollers engaging a rear rail of said way, said rear yoke rollers being mounted on a supporting bar movable forward and rearward a limited distance and spring means urging said supporting bar in the forward direction and maintaining alignment and cushioning movement of said carriage.

7. Apparatus in accordance with claim 6 wherein said supporting bar includes guide pins extending rearwardly through guide holes in a back plate of said carriage and said spring means includes spring plungers mounted on said back plate and having plungers extending forwardly into engagement with said supporting bar.

* * * * *